United States Patent
Hasan et al.

(10) Patent No.: US 11,389,010 B2
(45) Date of Patent: Jul. 19, 2022

(54) SEAT SHELL INFANT SEAT AND METHOD OF MANUFACTURE

(71) Applicant: BabyArk LTD, Hevel Modiln Industrial Park (IL)

(72) Inventors: Anan Hasan, Julis (IL); Oren Goor, Savyon (IL); Shy Mindel, Hod-HaSharon (IL)

(73) Assignee: BabyArk LTD, Hevel Modiln Industrial Park ( * ) Notice: Subject to any disclaimer, the term of this patent is extended or adjusted under 35 U.S.C. 154(b) by 0 days.

(21) Appl. No.: 16/092,780

(22) PCT Filed: Apr. 14, 2017

(86) PCT No.: PCT/IB2017/052173
§ 371 (c)(1),
(2) Date: Oct. 11, 2018

(87) PCT Pub. No.: WO2017/216649
PCT Pub. Date: Dec. 21, 2017

(65) Prior Publication Data
US 2020/0146462 A1      May 14, 2020

Related U.S. Application Data

(60) Provisional application No. 62/322,251, filed on Apr. 14, 2016.

(51) Int. Cl.
*A47C 1/00* (2006.01)
*A47D 1/00* (2006.01)
(Continued)

(52) U.S. Cl.
CPC .............. *A47D 1/002* (2013.01); *A47D 9/00* (2013.01); *A47C 1/00* (2013.01); *B60N 2/26* (2013.01); *B60N 2/28* (2013.01); *B60N 2/2821* (2013.01)

(58) Field of Classification Search
CPC .... A47D 1/00; A47D 9/00; A47C 1/00; A47C 1/002; B60N 2/26; B60N 2/28; B60N 2/2821; B60N 2/2842; B60N 2/2854
(Continued)

(56) References Cited

U.S. PATENT DOCUMENTS 4,348,049 A * 9/1982 Monot ................. A47D 13/025
297/254
4,936,628 A * 6/1990 Delaney ............... B60N 2/2839
297/153
(Continued)

FOREIGN PATENT DOCUMENTS

CA          2285486 A1     4/2001
CN          105034871      11/2015
(Continued)

OTHER PUBLICATIONS

Search Report dated Aug. 25, 2017 for corresponding PCT Application No. PCT/IB2017/052173.
(Continued)

*Primary Examiner* — Syed A Islam

(57) ABSTRACT

A shell for an infant seat comprises a carbon fiber structure reinforced by one or more reinforcing members of a material other than carbon fiber forming a shell shaped to accommodate an infant. The one or more reinforcing members is located on the concave side of the structure, e.g. between the structure and the infant. The structure and the one or more reinforcing members are fixed to each other so as to prevent relative movement between them in use. The reinforcing members may be made from plastic and may be overmolded or glued on the carbon fiber structure.

19 Claims, 7 Drawing Sheets

(51) Int. Cl.
*A47D 9/00* (2006.01)
*B60N 2/26* (2006.01)
*B60N 2/28* (2006.01)

(58) Field of Classification Search
USPC .......................................... 297/250.1–256.17
See application file for complete search history.

(56) References Cited

U.S. PATENT DOCUMENTS

| | | | |
|---|---|---|---|
| 5,150,222 A | | 9/1992 | Nakayama |
| 5,540,365 A | * | 7/1996 | LaMair ................ A47D 13/02 224/158 |
| 8,960,794 B2 | * | 2/2015 | St. Pierre ............. A47D 13/02 297/219.12 |
| 9,505,328 B2 | * | 11/2016 | Renault ................ B60N 2/686 |
| 2003/0104883 A1 | | 6/2003 | Caron |
| 2006/0097562 A1 | * | 5/2006 | Hiruta ................... A61G 5/10 297/467 |
| 2006/0181089 A1 | | 8/2006 | Andre et al. |
| 2006/0267386 A1 | | 11/2006 | Nakhla et al. |
| 2012/0169103 A1 | | 7/2012 | Rennault et al. |
| 2013/0099537 A1 | * | 4/2013 | Miyamoto ............. A47C 31/11 297/285 |
| 2014/0252814 A1 | | 9/2014 | Cohen et al. |

FOREIGN PATENT DOCUMENTS

| | | |
|---|---|---|
| CN | 105163978 | 12/2015 |
| EP | 0197910 | 10/1986 |
| GB | 2429401 | 6/2009 |

OTHER PUBLICATIONS

Search Report dated Oct. 11, 2019 for corresponding EP Application No. EP17812827.8.
Notification of Office Action and Search Report dated May 24, 2021 From the State Intellectual Property Office of the People's Republic of China Re. Application No. 201780036090.1 and Its Summary in English. (20 Pages).

* cited by examiner

SEAT SHELL INFANT SEAT AND METHOD OF MANUFACTURE

CROSS-REFERENCE TO RELATED APPLICATIONS

This application is a National Phase Application of PCT International Application No. PCT/IB2017/052173, International Filing Date Apr. 14, 2017, claiming the benefit of U.S. Provisional Patent Application No. 62/322,251, filed on Apr. 14, 2016, all of which are hereby incorporated by reference.

FIELD OF THE INVENTION

The present invention is in the field of seats for infants. The term "infants" herein is intended to refer to babies and small children, for example but not limited to those unable to walk and those for whom a special seat is required to travel in a road vehicle.

BACKGROUND OF THE INVENTION

Seats for infants are widely used, for example in buggies and push chairs and for transporting infants in vehicles. Some infant seats are designed to be portable by hand whilst accommodating the infant and therefore there is a need for them to be strong and lightweight.

SUMMARY OF EMBODIMENTS OF THE INVENTION

Some embodiments of the invention provide a shell for an infant seat comprising a carbon fiber structure reinforced by one or more reinforcing members of a material other than carbon fiber forming a shell shaped to accommodate an infant. The material other than carbon fiber may be plastic and it may be overmolded onto the carbon fiber structure. Thus according to some embodiments of the invention, a carbon fiber structure may be reinforced by another material such as plastic, rather than, for example, a plastic structure being reinforced by carbon fiber. Carbon fiber is a material with limited flexibility in terms of geometry design. Plastic on the other hand is more flexible and easier to form into a variety of shapes. Therefore according to some embodiments of the invention, carbon fiber may be used as the main structural support and may define the overall seat geometry, and these limitations may be overcome with the use of the material other than carbon. A seat shell according to embodiments of the invention may be designed for use in a vehicle to be either forward facing or rearward facing.

According to some embodiments of the invention, the carbon fiber structure may partially form the shell shaped to accommodate, or cradle, an infant. The remainder of the shell may be formed by the reinforcing members. According to other embodiments of the invention, the carbon fiber shell may be shaped to support the back and legs of an infant in a seated or lying position, in the manner of a plastic infant seat known in the art. The one or more reinforcing members may be located on the inside, e.g. concave side, of the carbon fiber structure. For example the carbon fiber structure may define the shell shape and the reinforcing member(s) may be positioned on the concave shell surface. Thus in use the one or more reinforcing members may be located between the infant and the carbon fiber structure, e.g. carbon fiber shell. The one or more reinforcing members may be shaped so as not to be uncomfortable for the infant, and/or they may be cushioned, for example by a padded insert received in the shell.

The combination of the carbon fiber structure and the one or more reinforcing members may be such that no relative movement between them is possible during use. For example the reinforcing members may be overmolded, injected or glued onto the carbon fiber structure or otherwise mechanically connected to the carbon fiber structure. Thus the shell according to some embodiments of the invention may comprise, from the user's point of view, a one piece structure with no separable parts.

One or more metal inserts may be inserted into the material of the reinforcing member(s) such as a seat belt mount or other attachment device.

The carbon fiber structure or shell may be very thin, for example no more than 2 mm thick and maybe even only 0.6 mm, and may have sharp edges. Thus according to some embodiments of the invention the seat shell may comprise one more edge protection members concealing at least a part of the edge of the carbon fiber structure. The edge protection may also be made of plastic and may also be overmolded onto the carbon fiber structure. For example in the case where the carbon fiber forms a shell the edge protection may be around some or all of the peripheral edge of the shell.

According to some embodiments of the invention, one or more structures of said other material, e.g. plastic, may be provided to receive a carrying handle, for example a guidance channel for a sliding handle or defining an axis for a pivotable handle.

Some embodiments of the invention provide a method of manufacturing a seat shell for a portable infant seat comprising: forming a structure of carbon fiber and reinforcing the structure with one or more reinforcing members of a material other than carbon fiber to form a shell shaped to accommodate an infant, wherein the one or more reinforcing members is located on the concave side of the shell.

Some embodiments of the invention provide a shell for an infant seat comprising a carbon fiber shell portion and one or more shell extension portions of a material other than carbon fiber, wherein the carbon fiber shell portion and the one or more shell extension portions are fixed to each other so as to prevent relative movement between them in use.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
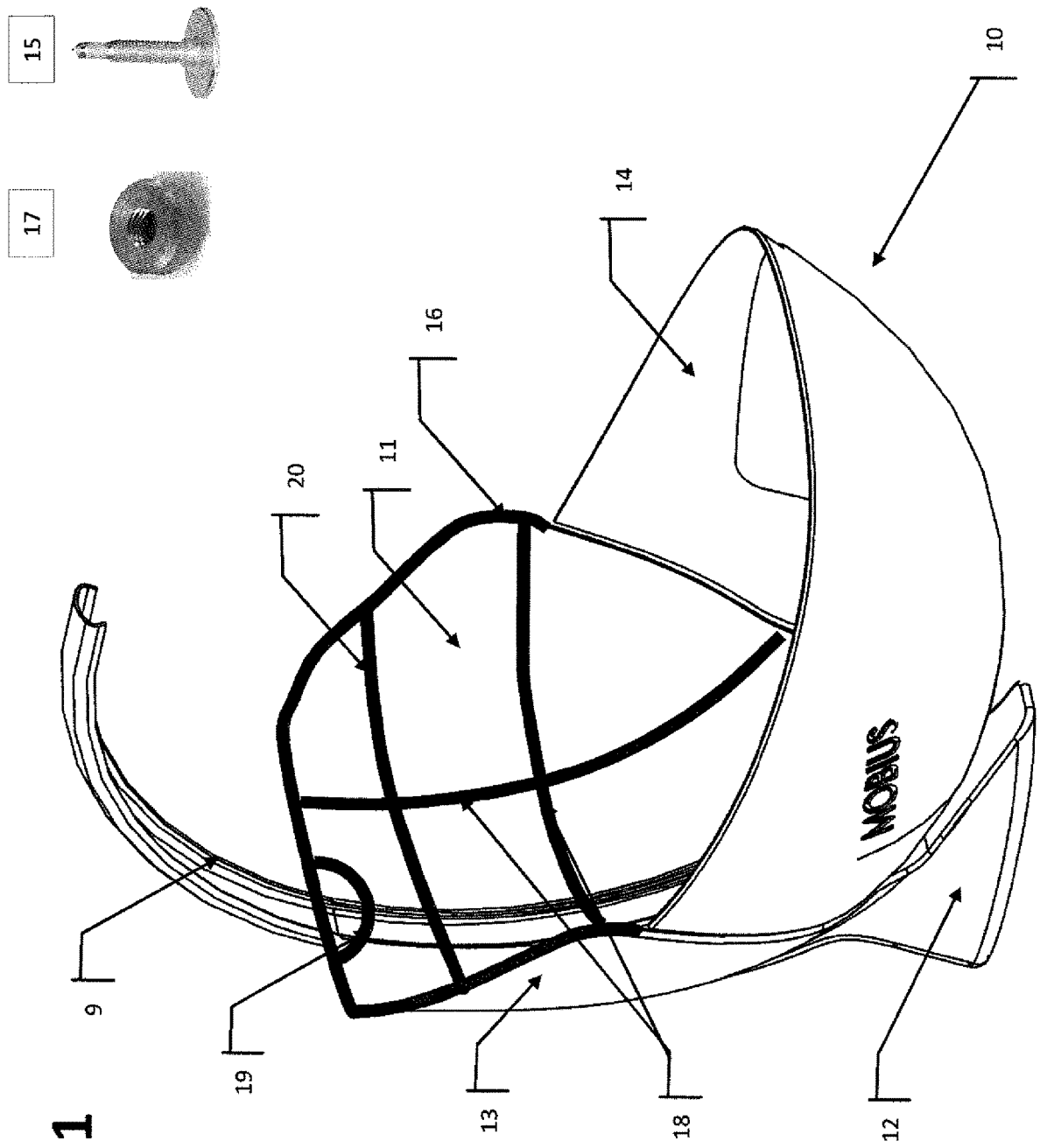
FIG. 1 is a perspective view of a seat for an infant according to some embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence.

Additionally, some of the described method embodiments or elements thereof can occur or be performed simultaneously, at the same point in time, or concurrently.

FIG. 1 is a perspective view of an infant seat 10, for example a car seat, comprising a seat shell 11 and a base 12. The seat shell 11 comprises a carbon fiber structure reinforced by reinforcing members 18. Reinforcing members 18 may be made of plastic and as illustrated they are located on the concave surface of the seat shell 11. In this embodiment, the carbon fiber structure includes a shell portion 13, in this example shaped to at least support the back of the infant in use, for example with the infant in a sitting position, or lying on its back with the seat tilted from the position shown in FIG. 1. The remainder 14 of the seat shell 11, in this example the part supporting the legs of the infant, may be formed of a material other than carbon fiber, for example plastic. The parts of the seat shell 11 not formed from carbon fiber may be non-structural areas, e.g. areas bearing less load, where the shell shape may be desirable for ergonomic and/or comfort reasons. Nevertheless such parts may also serve to reinforce the shell. The base 12, which may be designed to enable the seat to rest stably on a flat surface, may also be made of carbon fiber.

The reinforcing members 18 and the remainder 14 of shell may be formed by molding, for example injection molding into the carbon fiber structure.

Seat 10 is preferably provided as a one-unit structure, in which the seat shell 11, base 12 and reinforcing members 18 and remainder 14 are not separable. For example, in all embodiments described herein, the non-carbon components of the shell may be glued or over molded onto the carbon fiber structure, in this case the shell portion 13 and the base 12, or otherwise attached such that there is no relative movement between the parts in use.

The use of a carbon fiber structure in the design and manufacture of an infant seat leads to greatly reduced weight as compared for example to a plastic seat shell of equivalent strength.

In all embodiments of the invention described herein, it is possible but not essential for thethe carbon fiber material to be very thin, for example no more than 2 mm in thickness, and even 0.6 mm, and optionally uniform in thickness. Therefore if used alone the carbon fiber may have sharp edges. According to some embodiments of the invention, the edges, for example edges of the shell portion 13 of FIG. 1, may be concealed by one or more edge protection members. FIG. 1 shows a part of the peripheral edge of carbon fiber shell 13 portion protected by edge protection 16, which may be made of plastic. Edge protection 16 may be molded onto the structure, e.g. shell portion 13, for example by injection molding. Edge protection may be provided both for ergonomic reasons and to strengthen the seat shell 11.

One or more metal inserts may be inserted into the material of the shell parts which are not carbon fiber. Such inserts may include but are not limited to buckles, pins 15 and nuts 17. Such inserts may facilitate the mounting of components such as but not limited to a mount for a seat belt or a harness. This is an optional feature for any of the embodiments of the invention described herein.

The seat shell 11 shown in FIG. 1 may comprise one or more handle-receiving structures. This is an optional feature for any of the embodiments of the invention described herein. In FIG. 1 a loop 19 is indicated, which may be made from metal or plastic for example, for receiving a handle. A handle may be attached to loop 19 or loop 19 may form part of a guiding mechanism for a retractable handle. In FIG. 1 a handle 9 is shown, extending from the shell portion 13. Handle 9 may be made from carbon fiber and may include components of another material such as plastic, not shown, for example a knob at the end for the comfort of a person carrying the seat 10.

Figure 2:
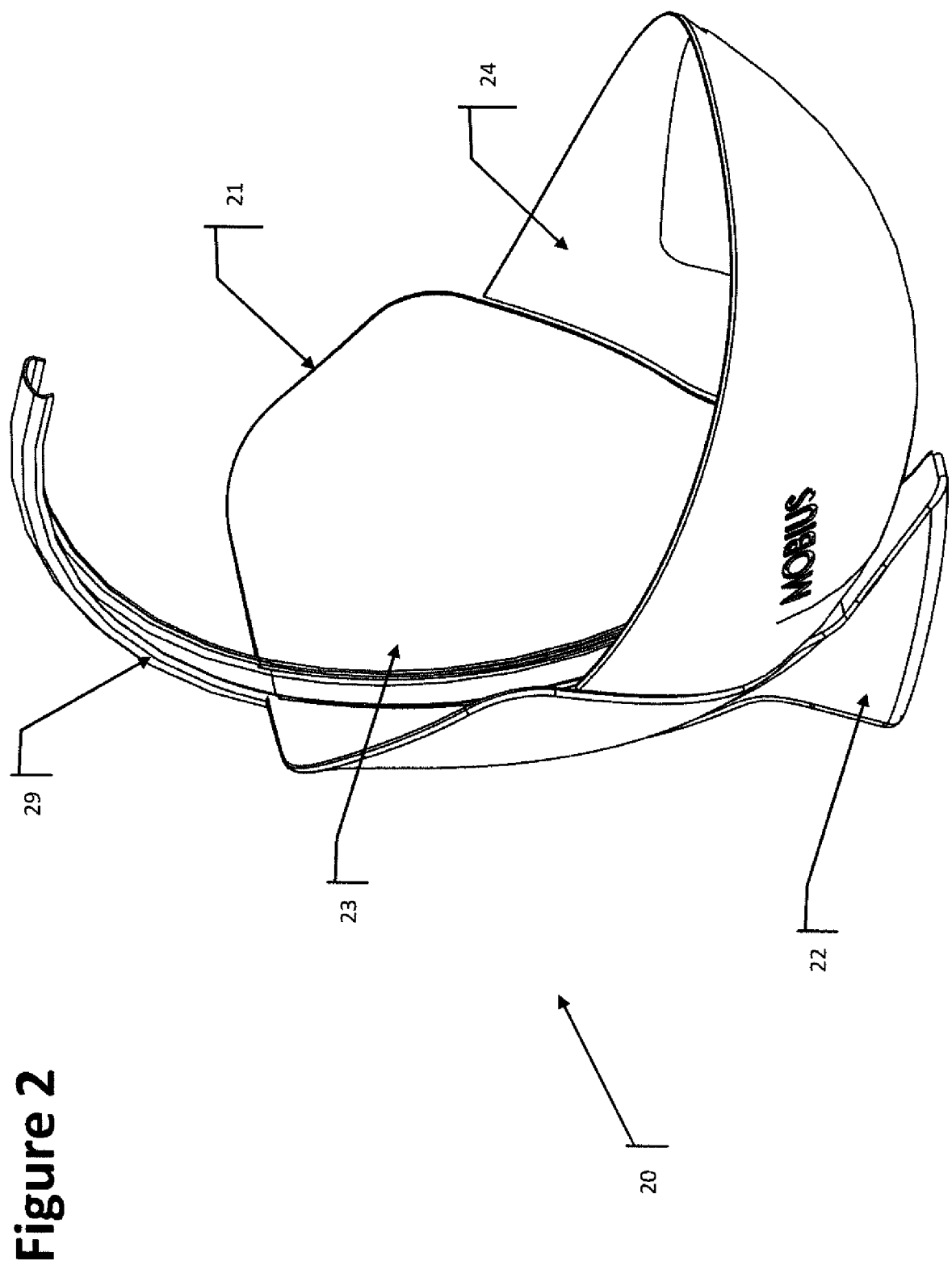
FIG. 2 is a perspective view of the seat of FIG. 1 omitting some of the reinforcing members.

FIG. 2 shows the seat of FIG. 1 omitting some of the reinforcing members. FIG. 2 shows a shell 21 and a base 22. The base 22 may be made from carbon fiber and form part of the carbon fiber structure. The shell 21 may comprise a carbon fiber shell portion 23 forming part of the carbon fiber structure to support the back of the infant. The shell portion 23 may be reinforced with one of more reinforcing members, not shown, of a material other than carbon fiber such as plastic. The seat includes a handle 29 which may also be made of carbon fiber and may be retractable into a slot, not shown, on the inside of the shell 21. Handle 29 may include components of another material such as plastic, not shown, for example a knob at the end for the comfort of a person carrying the seat 10. In the embodiment of FIG. 2 the remainder of the shell shaped to accommodate the infant may comprise a second shell portion 24 formed of a material other than carbon fiber and may serve to reinforce the carbon fiber structure and/or to render the design more ergonomic and comfortable for the infant.

Figure 3:
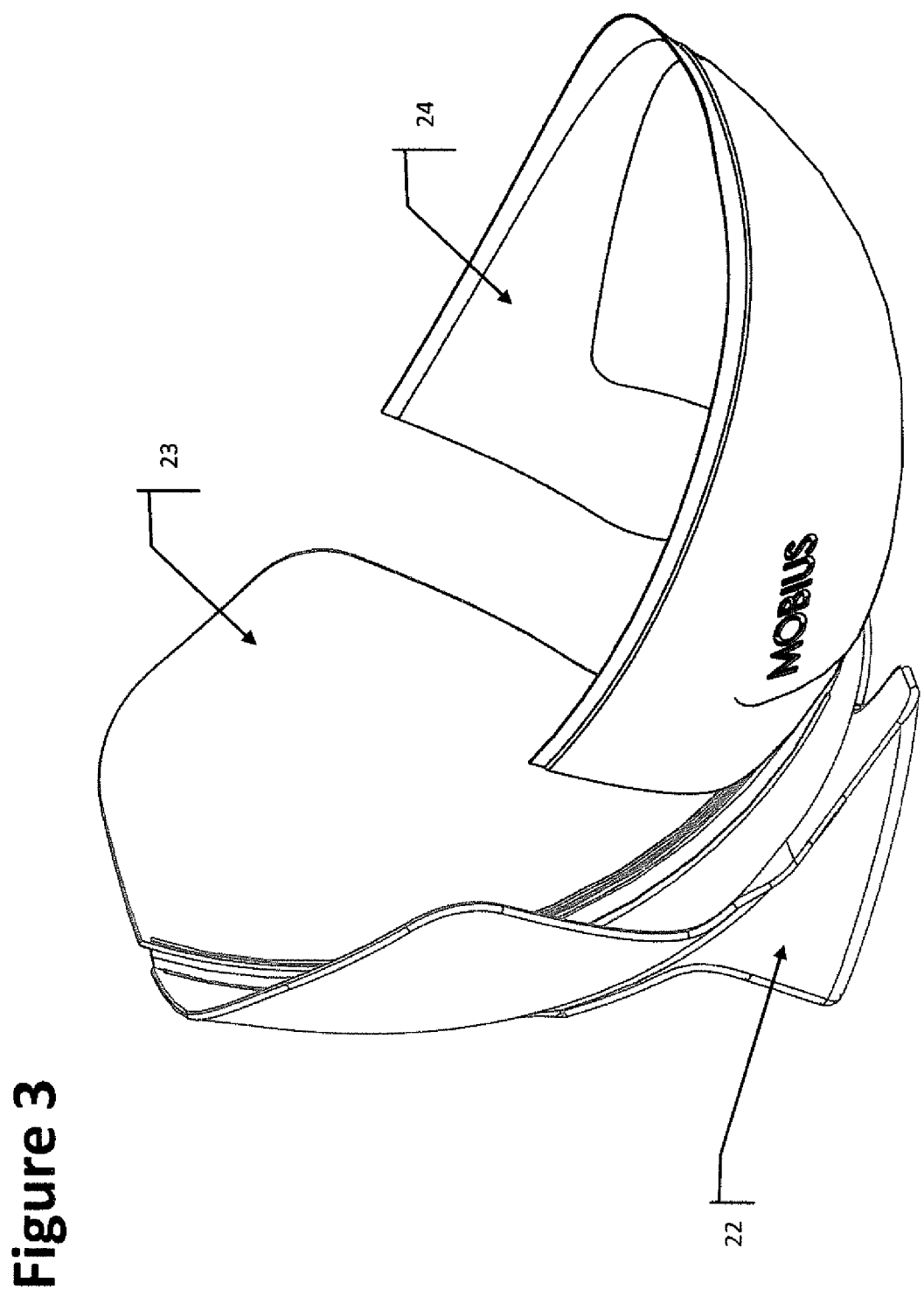
FIG. 3 is an exploded view of parts of the seat shown in FIG. 2.

FIG. 3 is an exploded view showing the carbon fiber structure comprising the shell portion 23 and the base 22, separated from the second shell portion 24. The carbon fiber structure may be provided with reinforcing members on its concave surface, for example as shown in FIG. 1 or in FIG. 4 described below. The second shell portion 24 is an example of the use of a material other than carbon fiber to extend the outer dimensions of the carbon fiber structure which in this case comprises the shell portion 23 and the base 22. FIGS. 2 and 3 illustrate the use of carbon fiber for structural areas, e.g. those parts of the seat shell subject to the greatest loading, and an additional material such as plastic for what might be called non-structural areas, e.g. areas subject to less loading. Part of the second shell portion 24 may be located on the convex surface of the shell portion 22. The second shell portion may serve to reinforce as well as to extend the carbon fiber structure.

Figure 4:
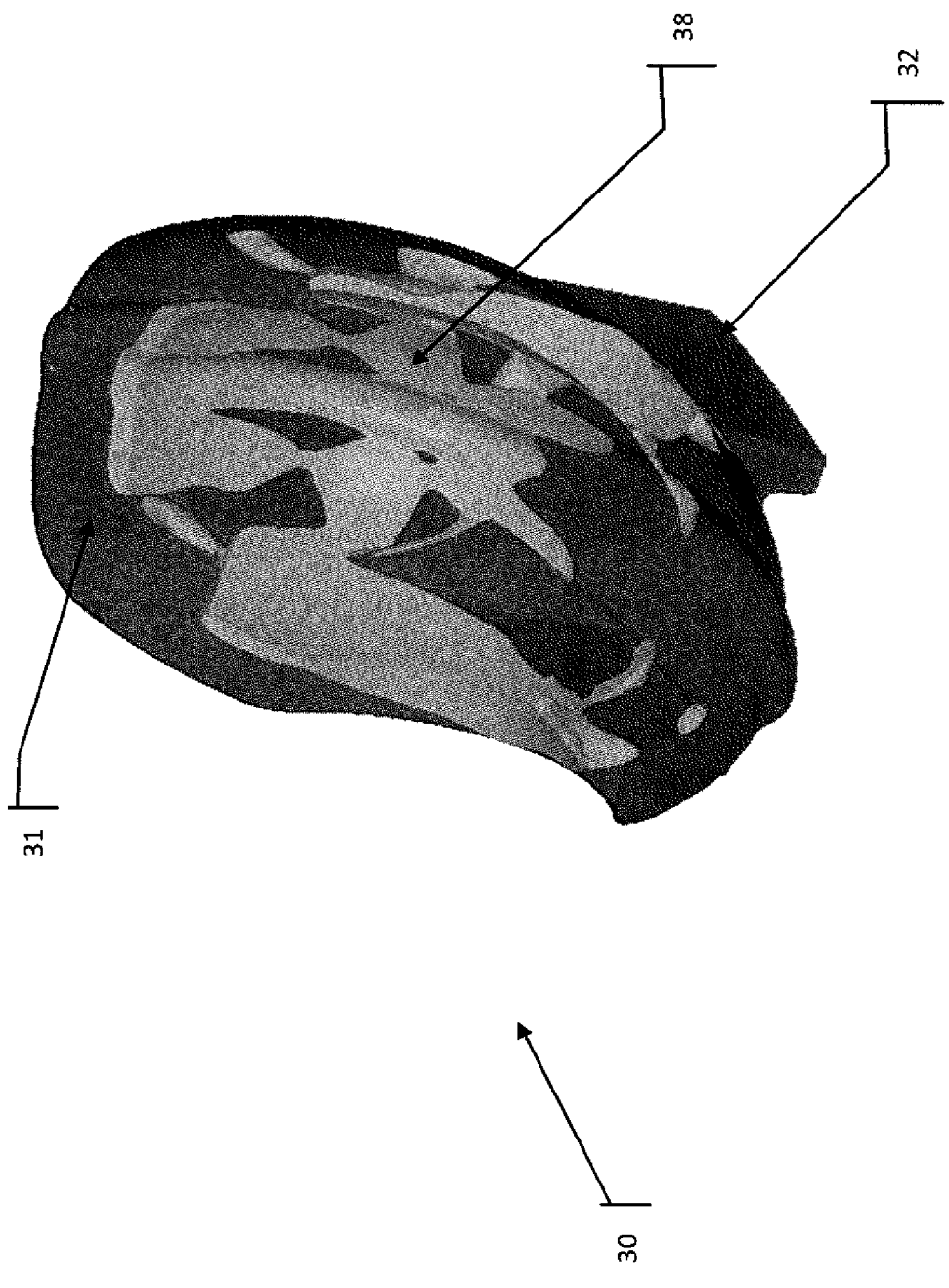
FIG. 4 shows the possible carbon and plastic reinforcement as a result of a stress analysis on a carbon fiber structure for an infant seat according to some embodiments of the invention.

FIG. 4 shows the result of an optimization stress analysis performed on a computer modelled seat 30 comprising a seat shell 31 and a base 32, which may both be fabricated from carbon fiber. The seat shell 31 is shaped to support the back and legs of an infant. The optimization runs numerous loading scenarios and stress analysis on the structure and changes the shape and size of the plastic in each iteration (in can also change the thickness of the carbon fiber if desired). The dark color represents the carbon fiber structure and the lighter colored areas represent the plastic reinforcements. The result of the optimization analysis is a specific geometry, not achievable by human, that is optimized to the loading scenario. For this reason, the geometry of the plastic reinforcements has a complex shape.

One or more reinforcing members may be overmolded onto the carbon fiber shell portion in regions corresponding to regions 38 resulting from the analysis. It will be noted that the regions have complex shapes which may not be easily achievable in with carbon fiber. Thus according to some embodiments of the invention, the reinforcement may be provided over a simple carbon fiber structure. For example the carbon fiber structure, such as shell portion 33, may have a uniform thickness. In this embodiment the ergonomic features and comfort of the shell may be provided by the carbon fiber structure and the parts of material other than carbon fiber may serve as reinforcement. This and other embodiments of the invention described herein may achieve a strong structure, optimized to loading from different directions and utilizing advantages of different materials. Features from different illustrated embodiments of the invention may be combined in any manner. Thus for example a seat shell according to the invention may include reinforcing and/or ergonomic features of a material other than carbon fiber in any combination.

Figure 5B:
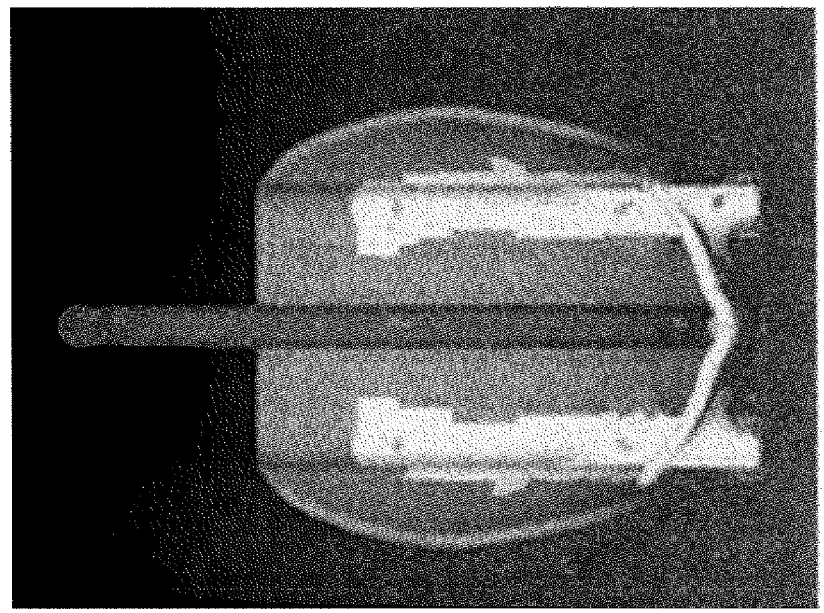
FIGS. 5A and 5B are perspective and front views of a seat structure made from carbon on which stress analysis was performed in order to determine appropriate locations for reinforcement.
Figure 5A:
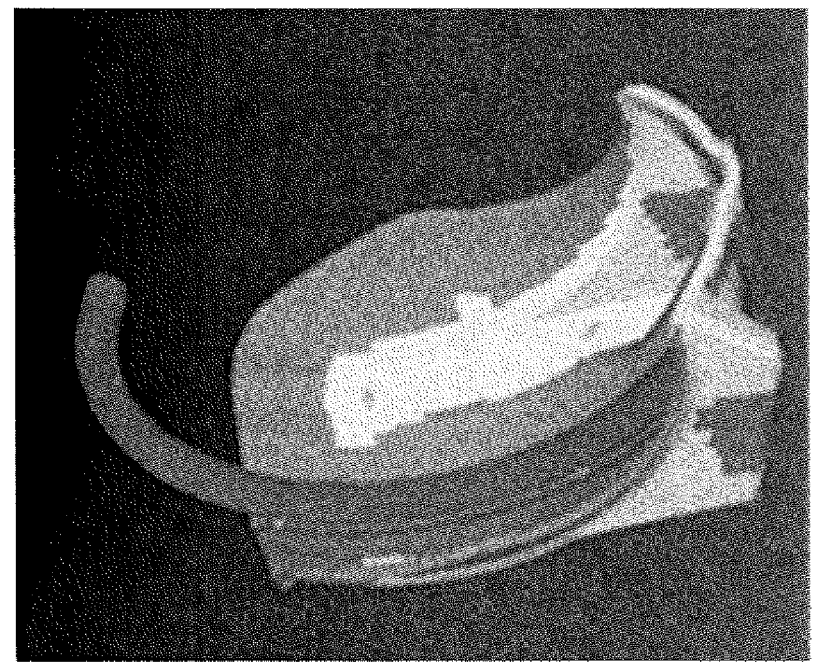

FIGS. 5A and 5B show a computer model of a structure made fully from carbon fibers on which a stress analysis was performed of the kind described with reference to FIG. 3. The different shades of grey represent different thicknesses of carbon fiber layers. The dark grey represents a structure with thickness of 0.8 mm and the bright color represents a thickness of 2.5 mm According to some embodiments of the invention, the bright parts, which require triple the amount of carbon fibers, may be replaced with reinforcement of a different material such as plastic. This significantly lowers the cost of the structure.

Figure 6:
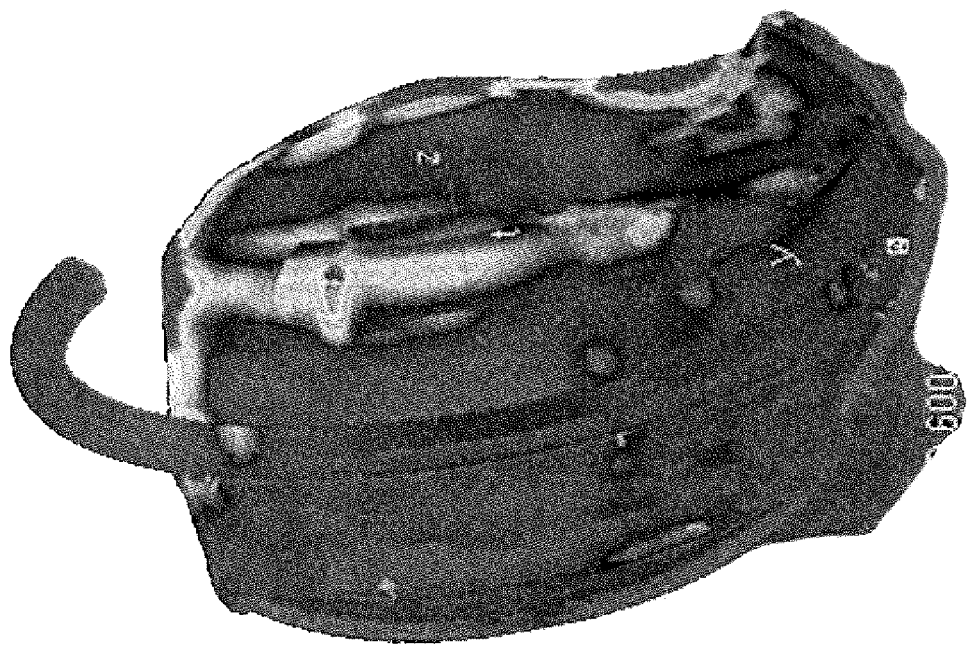
FIG. 6 is a perspective view showing the result of stress analysis on the structure shown in FIGS. 5A and 5B.

FIG. 6 shows the result of a stress analysis on the optimized structure shown in FIG. 4. The lightest colors indicate areas of maximum stress and it can be seen that these are very small.

Figure 7B:
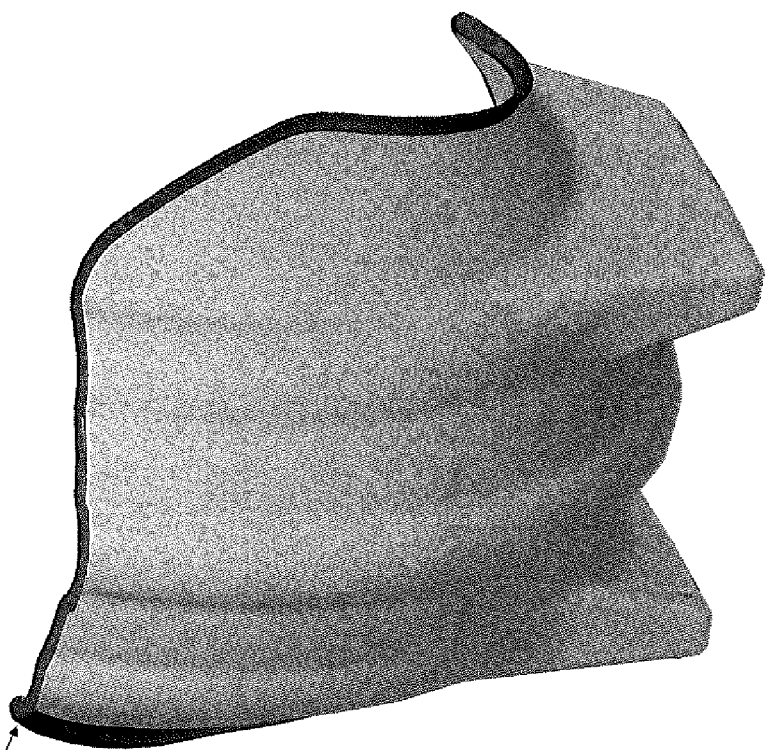
FIGS. 7A and 7B are views from different perspectives of a carbon seat structure showing overmolded material on the edges of the structure.
Figure 7A:
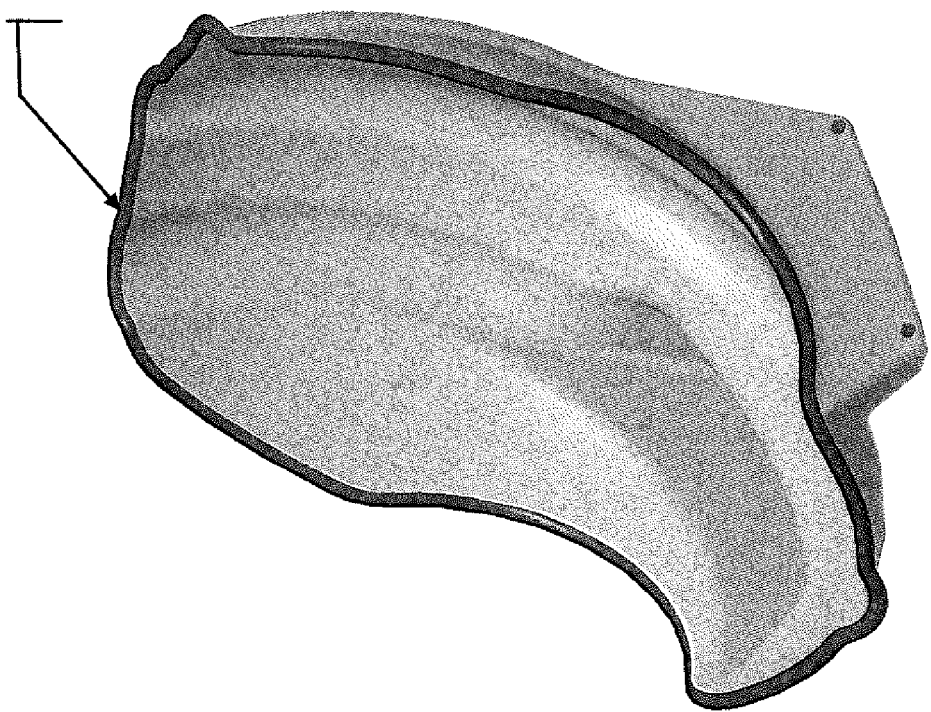

FIGS. 7A and 7B are perspective views of a carbon fiber seat shell with integral base made of uniform thickness material. The peripheral edge of the shell is concealed with an edge protection member 16 in the form of a strip running around the entire edge. In other embodiments of the invention, only part of the edges of the carbon fiber structure may be protected in this way, for example using multiple edge protection members.

In the embodiments of the invention described above, the seat shell may comprise a one piece item in which the carbon fiber structure and the reinforcing member(s) are not designed to be separated in use. Further they may be fixed to each other so as to prevent relative movement between them during use. This may be achieved in several ways including molding and gluing as described above or any other construction technique known to those skilled in the art.

In all embodiments of the invention, the reinforcing members may be located at positions of maximum loading of the carbon fiber structure according to the structure design. The positions of maximum loading may be determined for example by carrying out stress or load tests on the carbon fiber structure without the reinforcing members, for example as illustrated in FIG. 5.

It will be appreciated from the foregoing that embodiments of the invention may provide a seat shell with a carbon fiber structure in which material other than carbon fiber may be present and may serve various purposes such as but not limited to:

Strengthening or reinforcing the carbon fiber structure
Enhancing the structure from an ergonomic and/or comfort perspective
Providing flexible means for handle pivot/slide mechanism
Covering sharp edges
Supporting metal inserts.

In all embodiments of the invention, the material other than carbon fiber, e.g. plastic, may be used to extend the dimensions of the carbon fiber support structure in any dimension, for example the height. This may be in addition to or alternative to the provision of reinforcement on the concave side of the carbon fiber structure. This extension of a basic structure is not easily achieved with carbon fiber due to the required use of multiple layers and a layering procedure. However, a material such as plastic can easily be shaped in different geometries and dimensions to achieve the require strength in different directions.

Consider that stress is defined as follows:

$$\sigma = y\, M/I$$

where
$\sigma$=stress (Pa (N/m2), N/mm2, psi)
y=distance to point from neutral axis (m, mm, in)
M=bending moment (Nm, lb in)
I=moment of Inertia (m4, mm4, in4)

$$Ix = bh3/12$$

where
b=width
h=height

It can be seen that the ability of the material to withstand stress is improved with extra height by a factor of three times the added height, multiplied by the power of 3 to the height of the geometry. Therefore the used of plastic to add height to the carbon fiber structure can be a very effective way to improve the strength, for example only in required directions.

Some embodiments of the invention provide a method of manufacturing a seat shell for a portable infant seat. The method may comprise forming a structure of carbon fiber, and reinforcing the carbon fiber structure with one or more reinforcing members of a material other than carbon fiber. These forming and reinforcing steps may be performed separately or as part of the same manufacturing stage, for example over molding, e.g. injection molding. The reinforced structure thus produced may form a shell shaped to accommodate an infant. The reinforcing members may be positioned on the concave surface of the shell.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A one piece shell for an infant seat comprising:
a carbon fiber shell shaped structure, having a concave surface with at least a first portion of the concave surface shaped to support a back of an infant placed in said shell shaped structure, and a second and third portions of the concave surface substantially perpendicular to said first portion and shaped to support left and right arms of said infant, preventing said infant from horizontal movement parallel to said back supporting first portion; and
a plurality of non-carbon fiber reinforcing members, which are fixed to the concave surface of the carbon fiber shell shaped structure, at reinforcement locations, wherein at least one of said plurality of non-carbon fiber reinforcing members extends horizontally along said second, first and third portions and at least another one of said plurality of non-carbon fiber reinforcing members extends vertically along said first portion;
wherein the carbon fiber shell shaped structure and the plurality of non-carbon fiber reinforcing members are fixed to each other so as to prevent separation or relative movement between said carbon fiber shell shaped structure and said plurality of non-carbon fiber reinforcing members, in use.

2. The seat shell of claim 1 in which the plurality of non-carbon fiber reinforcing members are made of plastic.

3. The seat shell of claim 1 wherein the carbon fiber structure includes a carbon fiber shell portion shaped to support at least the back of an infant in use.

4. The seat shell of claim 1 wherein a remainder of the shell not shaped to support an infant is formed by the reinforcing members.

5. The seat shell of claim 1 wherein the carbon fiber shell portion is shaped to support the back and legs of an infant in a seated or lying position.

6. The seat shell of claim 1 wherein the plurality of non-carbon fiber reinforcing members at least partially form the shell shaped structure to accommodate an infant.

7. The seat shell of claim 1 wherein the reinforcing members are overmolded onto the carbon fiber structure.

8. The seat shell of claim 7 comprising one or more metal inserts inserted into the overmolded material.

9. The seat shell of claim 1 wherein the carbon fiber structure has one or more edges, further comprising one or more edge protection members concealing at least part of the one or more edges.

10. The seat shell of claim 9 in which the edge protection members are made of plastic.

11. The seat shell of claim 9 in which the one or more edge protection members are overmolded onto the carbon fiber structure.

12. The seat shell of claim 1 further comprising one or more structures of said material other than carbon fiber for receiving a handle.

13. The seat shell of claim 12 wherein said one or more handle-receiving structures comprise a guidance channel for a sliding handle.

14. The seat shell of claim 12 wherein said one or more handle-receiving structures define an axis for a pivotable handle.

15. The seat shell of claim 12 wherein said one or more structures are overmolded onto said carbon fiber structure.

16. The seat shell of claim 1 in which the maximum thickness of the carbon fiber structure is 2 mm.

17. The seat shell of claim 1 wherein the plurality of non-carbon fiber reinforcing members extend the outer dimensions of the carbon fiber structure.

18. The seat shell of claim 1 wherein said carbon fiber shell shaped structure includes an integral base made of uniform thickness material.

19. The seat shell of claim 13, wherein said guidance channel is a slot along a concave side of said first portion of the concave surface.

* * * * *